(12) United States Patent
Hale

(10) Patent No.: US 8,959,827 B1
(45) Date of Patent: Feb. 24, 2015

(54) ENHANCED ACTION FISHING LURES

(76) Inventor: Robert E. Hale, Hosston, LA (US)

( * ) Notice: Subject to any disclaimer, the term of this patent is extended or adjusted under 35 U.S.C. 154(b) by 406 days.

(21) Appl. No.: 13/134,754

(22) Filed: Jun. 16, 2011

(51) Int. Cl.
*A01K 85/00* (2006.01)

(52) U.S. Cl.
USPC .................................. 43/42.24; 43/42.26

(58) Field of Classification Search
USPC ........... 43/42.15, 42.24, 42.03, 42.26, 42.28, 43/42.5, 42.52; D22/125, 126, 129–132
See application file for complete search history.

(56) References Cited

U.S. PATENT DOCUMENTS

| | | | | |
|---|---|---|---|---|
| 857,593 | A * | 6/1907 | Brown | 43/42.15 |
| 1,109,439 | A * | 9/1914 | Maus | 43/42.15 |
| 1,361,067 | A | 12/1920 | Jordan | |
| 1,362,586 | A * | 12/1920 | Ackerman | 43/42.5 |
| 1,707,407 | A * | 4/1929 | Miles | 43/42.16 |
| D117,378 | S * | 10/1939 | Larson | D22/131 |
| 2,223,591 | A * | 12/1940 | Andersson | 43/42.51 |
| 2,246,850 | A * | 6/1941 | Housberg | 43/42.39 |
| 2,493,692 | A * | 1/1950 | Pareti et al. | 43/42.51 |
| 2,547,264 | A * | 4/1951 | Helman et al. | 43/42.5 |
| 2,717,467 | A * | 9/1955 | Godon | 43/42.5 |
| 2,787,860 | A * | 4/1957 | Carr | 43/42.5 |
| 2,795,076 | A * | 6/1957 | Luft | 43/42.52 |
| 2,828,572 | A * | 4/1958 | Sargent | 43/42.5 |
| 2,847,791 | A * | 8/1958 | Simmons | 43/42.26 |
| D188,194 | S * | 6/1960 | Wernick | 43/42.5 |
| 2,948,984 | A * | 8/1960 | Crawford | 43/42.5 |
| 2,959,883 | A * | 11/1960 | Smith et al. | 43/42.5 |
| 2,971,285 | A * | 2/1961 | Murawski | 43/42.15 |
| 3,021,636 | A * | 2/1962 | Gowdy | 43/42.52 |
| 3,055,138 | A * | 9/1962 | Mutti | 43/42.13 |
| 3,122,853 | A * | 3/1964 | Koonz et al. | 43/42.24 |
| 3,218,750 | A * | 11/1965 | Lewin | 43/42.28 |
| 3,264,775 | A * | 8/1966 | Nahigian | 43/42.39 |
| 3,284,944 | A * | 11/1966 | Settle | 43/42.15 |
| 3,445,953 | A * | 5/1969 | Dailey | 43/42.26 |
| 3,490,165 | A * | 1/1970 | Thomassin | 43/42.24 |
| 3,676,948 | A * | 7/1972 | Hill | 43/42.45 |
| 3,735,518 | A * | 5/1973 | Kleine et al. | 43/42.15 |
| 3,981,096 | A * | 9/1976 | Toivonen | 43/42.5 |
| 3,983,656 | A * | 10/1976 | Bain | 43/42.24 |
| 4,155,192 | A * | 5/1979 | Varaney | 43/42.5 |
| 4,164,826 | A * | 8/1979 | Metzler et al. | 43/42.39 |
| 4,441,275 | A * | 4/1984 | Leszkiewicz | 43/42.5 |
| 4,573,283 | A * | 3/1986 | Pippert | 43/42.24 |
| 4,665,642 | A * | 5/1987 | Steinman | 43/42.52 |
| 4,936,041 | A * | 6/1990 | Couture | 43/42.5 |
| 5,077,930 | A * | 1/1992 | Berry | 43/42.39 |
| 5,406,738 | A * | 4/1995 | Holleman, Sr. | 43/42.15 |
| D364,670 | S * | 11/1995 | Dennison | D22/133 |
| D381,062 | S * | 7/1997 | Hansen et al. | D22/133 |
| 5,678,350 | A * | 10/1997 | Moore | 43/42.15 |
| 5,946,848 | A * | 9/1999 | Ysteboe et al. | 43/42.15 |
| 6,073,383 | A * | 6/2000 | Line | 43/42.24 |
| 6,094,856 | A * | 8/2000 | Sam | 43/42.5 |

(Continued)

FOREIGN PATENT DOCUMENTS

| | | | | | |
|---|---|---|---|---|---|
| JP | | 10004823 A | * | 1/1998 | ............ A01K 85/00 |
| JP | | 2000253775 A | * | 9/2000 | ............ A01K 85/00 |

(Continued)

*Primary Examiner* — Darren W Ark

(74) *Attorney, Agent, or Firm* — R. Keith Harrison

(57) ABSTRACT

An enhanced action fishing lure includes a lure body having a first side lure body surface and a second side lure body surface and at least one action bump protruding from one of the first side lure body surface and the second side lure body surface.

11 Claims, 4 Drawing Sheets

(56) References Cited

U.S. PATENT DOCUMENTS

| | | | |
|---|---|---|---|
| 6,173,522 B1 | 1/2001 | Couch | |
| 6,202,338 B1 * | 3/2001 | Carr | 43/42.5 |
| 6,269,583 B1 * | 8/2001 | Tashchyan | 43/42.5 |
| 6,301,823 B1 * | 10/2001 | Monticello et al. | 43/42.5 |
| 6,385,896 B1 * | 5/2002 | Thomassin | 43/42.03 |
| 6,460,286 B1 * | 10/2002 | Wilson | 43/42.15 |
| 6,493,984 B1 * | 12/2002 | Bechhold | 43/42.51 |
| 6,910,295 B2 * | 6/2005 | Nakahashi | 43/42.15 |
| 6,912,808 B1 * | 7/2005 | Mak | 43/42.15 |
| 6,922,939 B2 * | 8/2005 | Moorhouse | 43/42.24 |
| 7,080,476 B2 * | 7/2006 | King | 43/42.24 |
| 7,114,285 B1 * | 10/2006 | Ince | 43/42.26 |
| 7,168,203 B2 * | 1/2007 | Chambers, Sr. | 43/42.28 |
| 7,322,151 B2 * | 1/2008 | Guigo et al. | 43/42.26 |
| 7,356,963 B2 * | 4/2008 | Scott | 43/42.15 |
| 7,493,724 B1 * | 2/2009 | Peterson | 43/42.03 |
| 7,730,658 B1 * | 6/2010 | Biffle et al. | 43/42.24 |
| 7,774,974 B1 * | 8/2010 | Parks | 43/42.28 |
| 7,845,107 B1 * | 12/2010 | Mell | 43/42.24 |
| D652,478 S * | 1/2012 | Rago | D22/131 |
| 8,181,382 B2 * | 5/2012 | Pack | 43/42.15 |
| D680,189 S * | 4/2013 | Olguin | D22/131 |
| D680,190 S * | 4/2013 | Olguin | D22/131 |
| D694,850 S * | 12/2013 | King | D22/131 |
| D698,887 S * | 2/2014 | Jones et al. | D22/126 |
| D705,891 S * | 5/2014 | King | D22/131 |
| 2008/0289244 A1 * | 11/2008 | Parks | 43/42.24 |
| 2009/0094879 A1 * | 4/2009 | Beck | 43/42.51 |
| 2014/0020277 A1 * | 1/2014 | Elgin | 43/42.33 |

FOREIGN PATENT DOCUMENTS

| | | | | |
|---|---|---|---|---|
| JP | 2001061371 A | * | 3/2001 | A01K 85/00 |
| JP | 2001161219 A | * | 6/2001 | A01K 85/00 |
| JP | 2006055062 A | * | 3/2006 | A01K 85/00 |
| JP | 2006223296 A | * | 8/2006 | A01K 85/00 |
| JP | 2007089526 A | * | 4/2007 | A01K 85/00 |
| JP | 2007174925 A | * | 7/2007 | A01K 85/00 |
| WO | WO02063952 A1 | * | 8/2002 | A01K 85/00 |

* cited by examiner

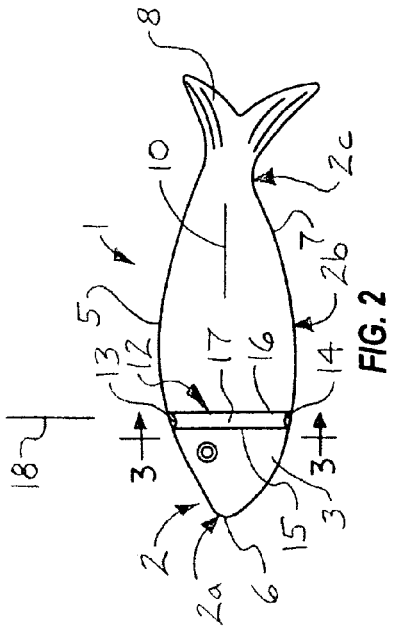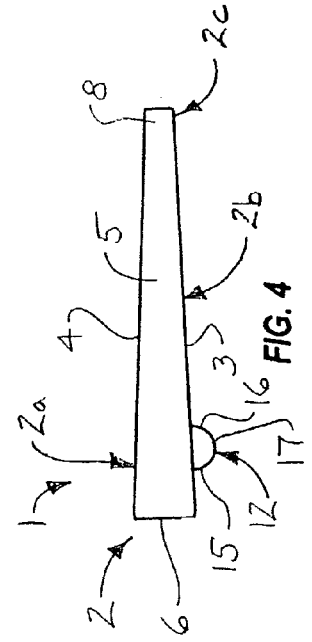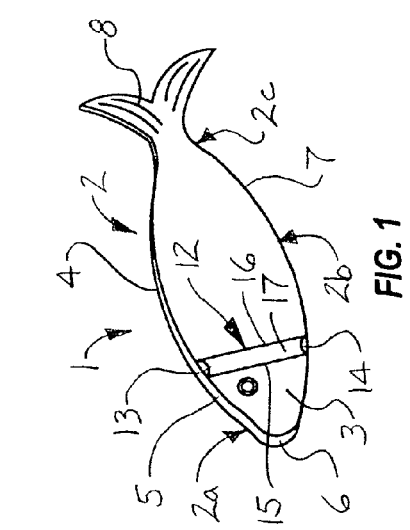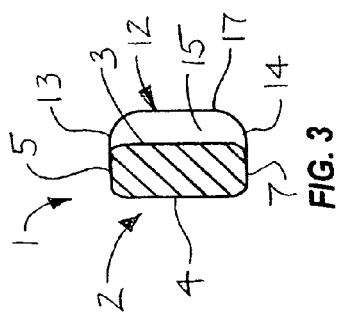

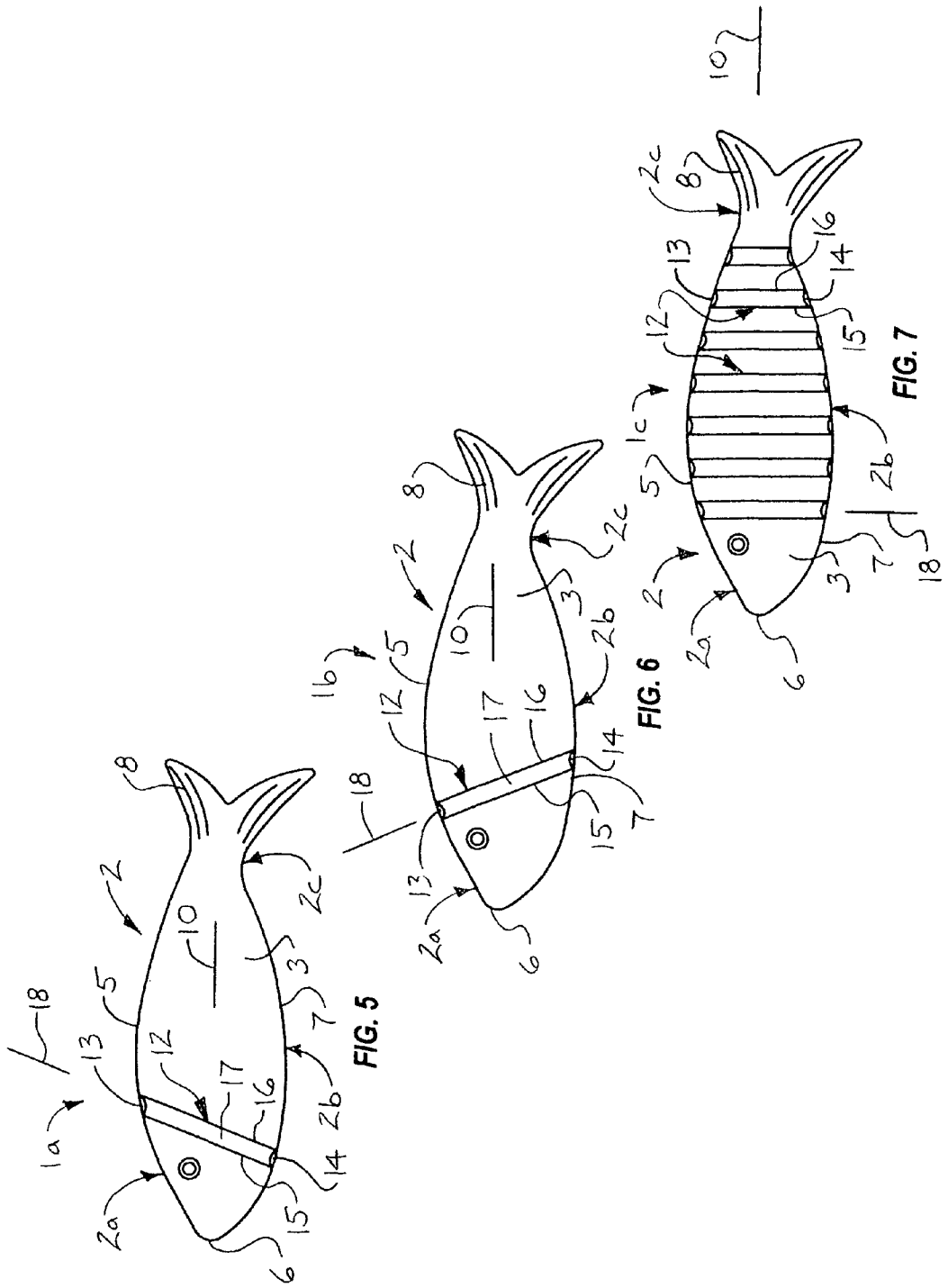

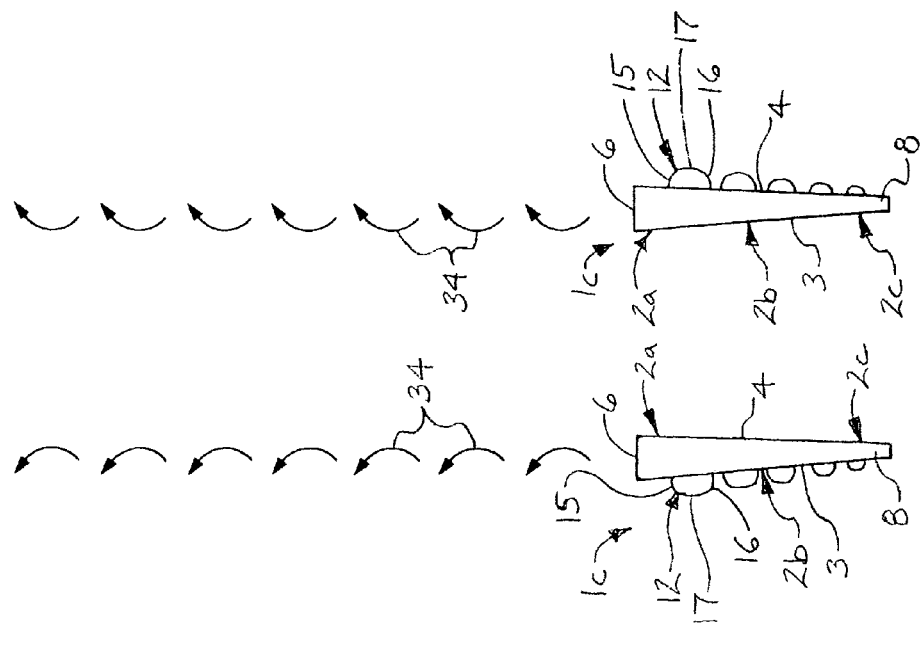
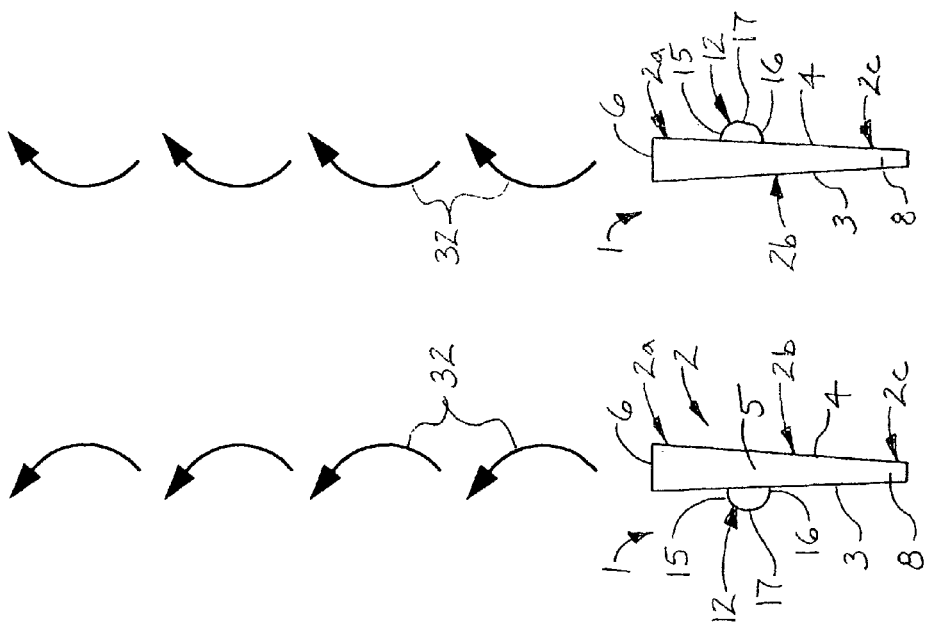
FIG. 11
FIG. 12
FIG. 13
FIG. 14

ENHANCED ACTION FISHING LURES

FIELD

The disclosure generally relates to fishing lures. More particularly, the disclosure relates to fishing lures having at least one action bump which enhances the swimming action of the lures as the lures are retrieved through water.

BACKGROUND

Fishing lures typically have a hard or soft plastic lure body which is shaped in the configuration of a fish, worm, frog, crawfish or other water creature and is tied to a fishing line that typically extends from a fishing pole. The fishing line may be wound on a crank-operated reel which is provided on the fishing pole to facilitate casting of the fishing lure into a lake or other water body and retrieval of the fishing lure through or across the surface of the water body by operation of the crank. A fishing lure having a particular size, shape, color and appearance may be selected for attachment to the fishing line to attract fish of a desired type during retrieval of the lure. Connectors such as eye hooks or the like may be provided on the surface of the body of the lure to secure various attachments such as a fishing line, fishing hooks or spinners to the lure.

One of the challenges of designing plastic fishing lures is that of selecting a design which effectively attracts fish to the lure as the lure is retrieved through water. To this end, various attachments such as spinners, streamers and "spoons" have been attached to fishing lures to reflect light or otherwise increase visibility of the lure and attract fish to the lure during retrieval. Rattles have also been incorporated into the soft or hard plastic lure body of fishing lures to create a rattling sound which attracts fish during lure retrieval. These techniques have achieved varying degree of success in attracting fish to the lure.

Therefore, fishing lures having at least one action bump which enhances the swimming action of the lure as the lure is retrieved through water are needed.

SUMMARY

The disclosure is generally directed to an enhanced action fishing lure which enhances the swimming action of the lure as the lure is retrieved through water. An illustrative embodiment of the enhanced action fishing lure includes a lure body having a first side lure body surface and a second side lure body surface and at least one action bump protruding from one of the first side lure body surface and the second side lure body surface.

In some embodiments, the enhanced action fishing lure may include a generally elongated lure body having a longitudinal lure body axis and including a head body portion, a middle body portion extending from the head body portion, a tail body portion extending from the middle body portion, a generally planar first side lure body surface and a generally planar second side lure body surface opposite the first lure body surface; and at least one generally elongated action bump protruding from one of the first side lure body surface and the second side lure body surface generally between the head body portion and the middle body portion and having a longitudinal action bump axis intersecting the longitudinal lure body axis of the lure body.

In some embodiments, the enhanced action fishing lure may include a generally elongated lure body having a longitudinal lure body axis and including a head body portion, a middle body portion extending from the head body portion, a tail body portion extending from the middle body portion, a generally planar first side lure body surface, a generally planar second side lure body surface opposite the first side lure body surface and an upper lure body edge, a front lure body edge and a lower lure body edge bounding the first side lure body surface and the second side lure body surface; and a plurality of generally elongated action bumps protruding from one of the first side lure body surface and the second side lure body surface in generally parallel, spaced-apart relationship to each other and each having a longitudinal action bump axis intersecting the longitudinal lure body axis of the lure body.

BRIEF DESCRIPTION OF THE DRAWINGS

The disclosure will now be made, by way of example, with reference to the accompanying drawings, in which:

FIG. 1 is a perspective view of an illustrative embodiment of the enhanced action fishing lures;

FIG. 2 is a left side view of an illustrative embodiment of the enhanced action fishing lures;

FIG. 3 is a cross-sectional view of an illustrative embodiment of the enhanced action fishing lures, taken along section lines 3-3 in FIG. 2;

FIG. 4 is a top view of an illustrative embodiment of the enhanced action fishing lures;

FIG. 5 is a left side view of another illustrative embodiment of the enhanced action fishing lures, more particularly illustrating a forward slant configuration of an action bump on the lure body of the fishing lure;

FIG. 6 is a left side view of another illustrative embodiment of the enhanced action fishing lures, more particularly illustrating a reverse slant configuration of an action bump on the lure body of the fishing lure;

FIG. 7 is a left side view of an illustrative multi-bump embodiment of the enhanced action fishing lures;

FIG. 11 is a top view of an illustrative embodiment of the enhanced action fishing lures with an action bump on a left side lure body surface of the lure body, more particularly illustrating a "walking" swim path of the fishing lure to the left;

FIG. 12 is a top view of an illustrative embodiment of the enhanced action fishing lures with an action bump on a right side lure body surface of the lure body, more particularly illustrating a "walking" swim path of the fishing lure to the right;

FIG. 13 is a top view of an illustrative embodiment of the enhanced action fishing lures with multiple action bumps on a left side lure body surface of the lure body, more particularly illustrating a "vibrating" motion of the fishing lure to the left; and FIG. 14 is a top view of an illustrative embodiment of the enhanced action fishing lures with multiple action bumps on a right side lure body surface of the lure body, more particularly illustrating a "vibrating" motion of the fishing lure to the right.

DETAILED DESCRIPTION

Figure 8:
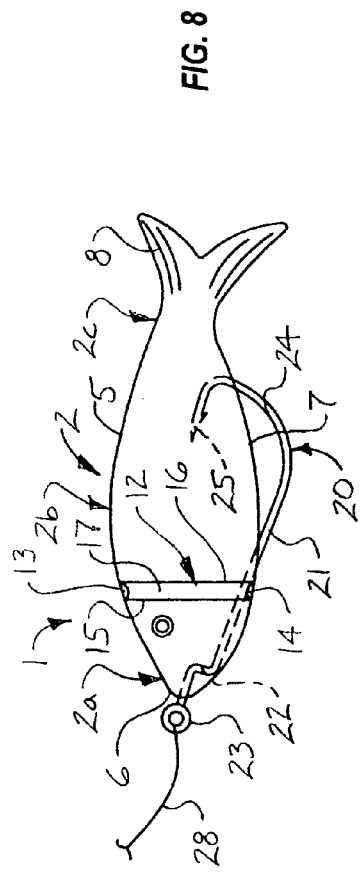
FIG. 8 is a left side view of an illustrative embodiment of the enhanced action fishing lures, with a hook embedded in the fishing lure and a fishing line attached to the hook.
Figure 9:
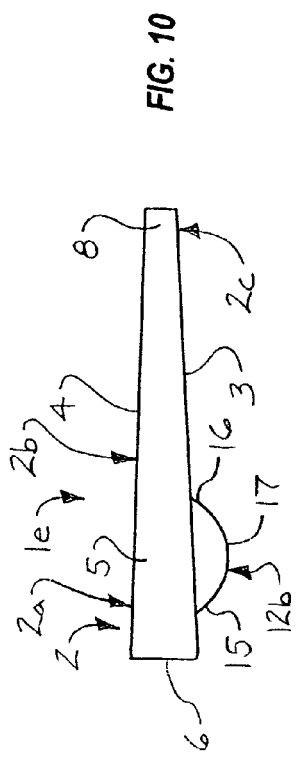
FIG. 9 is a top view of another illustrative embodiment of the enhanced action fishing lures, with a tapered action bump on the lure body.
Figure 10:
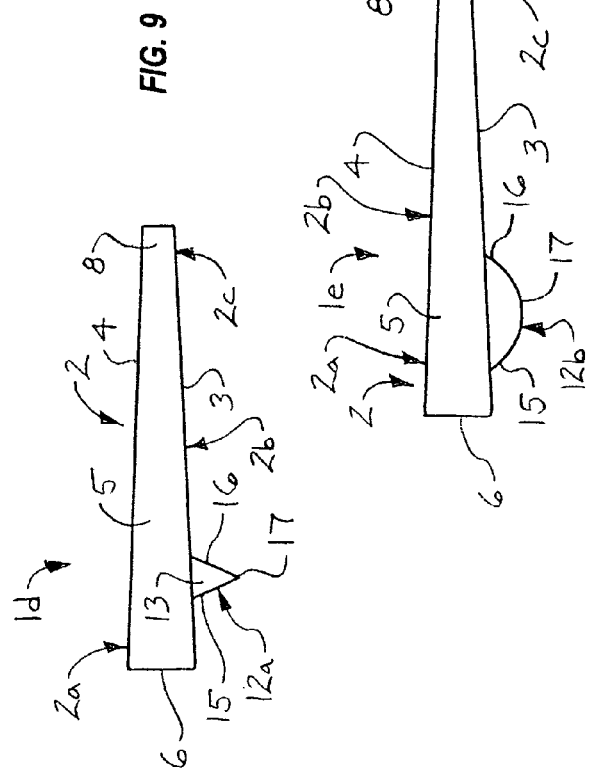
FIG. 10 is a top view of another illustrative embodiment of the enhanced action fishing lures, with a curved action bump on the lure body.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, relative terms such as "side", "front", "left", "right", "upper" and "lower" are used for descriptive purposes only and shall not be construed in a limiting sense.

Referring initially to FIGS. 1-4 of the drawings, an illustrative embodiment of the enhanced action fishing lure, hereinafter fishing lure, is generally indicated by reference numeral 1. The fishing lure 1 includes a lure body 2 which may be any soft plastic material that may be used to fabricate soft plastic fishing lures in the fishing lure industry. The lure body 2 may have a generally cone-shaped head body portion 2a, a middle body portion 2b which widens rearwardly from the head body portion 2a and a tapered tail body portion 2c which extends rearwardly from the middle body portion 2b. The lure body 2 may include a left side lure body surface 3 and a right side lure body surface 4, each of which may be generally flat or planar. In some embodiments, the left side lure body surface 3 and the right side lure body surface 4 may be generally parallel and spaced-apart with respect to each other. As illustrated in FIG. 4, in some embodiments, the lure body 2 may be generally wedge-shaped and the left side lure body surface 3 and the right side lure body surface 4 may be disposed at a slight angle with respect to each other, with the lure body 2 gradually narrowing from the head body portion 2a toward the tail body portion 2c. The left side lure body surface 3 and the right side lure body surface 4 may be bounded by an upper lure body edge 5, a front lure body edge 6 and a lower lure body edge 7. Each of the upper lure body edge 5, the front lure body edge 6 and the lower lure body edge 7 may be generally flat when viewed in cross-section, as illustrated with respect to the upper lure body edge 5 and the lower lure body edge 7 in FIG. 3. In some embodiments, a lure tail 8 of selected design may be formed or shaped in the tail portion 2c of the lure body 2, extending rearwardly from the upper lure body edge 5 and the lower lure body edge 7. As illustrated in FIG. 2, the lure body 2 may be generally elongated with a longitudinal lure body axis 10.

At least one action bump 12 protrudes from the left lure body surface 3 or the right lure body surface 4 of the lure body 2. In some embodiments, at least one action bump 12 protrudes from the left side lure body surface 3 of the lure body 2. In other embodiments, at least one action bump 12 protrudes from the right side lure body surface 4 of the lure body 2. In some embodiments, a single action bump 12 may protrude from the left side lure body surface 3 or from the right side lure body surface 4 generally at the transition between the head body portion 2a and the middle body portion 2b of the lure body 2. As illustrated in FIG. 2, the single action bump 12 may be generally elongated with a longitudinal action bump axis 18 which intersects the longitudinal lure body axis 10 of the lure body 2. The action bump 12 may generally extend from the upper lure body edge 5 to the lower lure body edge 7 of the lure body 2. In some embodiments, the longitudinal action bump axis 18 of the action bump 12 may be disposed in generally perpendicular relationship with respect to the longitudinal lure body axis 10 of the lure body 2. The action bump 12 may have an upper bump end 13 which may be generally flush or coplanar with the upper lure body edge 5 and a lower bump end 14 which may be generally flush or coplanar with the lower lure body edge 7 of the lure body 2. As illustrated in FIG. 4, in some embodiments, the action bump 12 may have a generally convex front bump surface 15 which generally faces the head body portion 2a of the lure body 2, a generally convex rear bump surface 16 which generally faces the tail body portion 2c of the lure body 2 and a generally convex outer bump surface 17 which extends between the front bump surface 15 and the rear bump surface 16. In the various embodiments of the fishing lure 1, the action bump or action bumps 12 can be formed in the lure body 2 using conventional injection molding or other fabrication techniques known by those skilled in the art.

Referring next to FIG. 8 of the drawings, in exemplary application, the fishing lure 1 is attached to a fishing hook 20 which is tied to a fishing line 28. The fishing line 28 may be wound on a rod-mounted reel (not illustrated) which facilitates casting of the fishing lure 1 and retrieval of the fishing lure 1 on the fishing hook 20 through a water body (not illustrated) by operation of the reel typically in the conventional manner. In some applications, the fishing hook 20 may be a 90-degree offset hook which is embedded in the lure body 2 of the lure 1 in a Texas rig style, as illustrated. The 90-degree offset fishing hook 20 may include an elongated hook shaft 21 having a 90-degree shaft offset 22. A shaft eye 23 may terminate the shaft offset 22 in front of the head body portion 2a of the lure body 2. A hook bend 24 is shaped in the hook shaft 21 and terminates in a hook barb 25 which may be embedded in the lure body 2.

Referring next to FIGS. 11 and 12 of the drawings, the fishing lure 1 is retrieved through a water body (not illustrated) typically by rotating the fishing rod-mounted reel (not illustrated) on which the fishing line 28 is wound in the conventional manner. In embodiments of the fishing lure 1 in which the action bump 12 protrudes from the left side lure body surface 3, as illustrated in FIG. 11, the fishing lure 1 repeatedly "walks" to the left along curved swim paths 32 as the fishing lure 1 is retrieved through the water body. In embodiments of the fishing lure 1 in which the action bump 12 extends from the right side lure body surface 4, as illustrated in FIG. 12, the fishing lure 1 repeatedly "walks" to the right along curved swim paths 32 as the fishing lure 1 is retrieved through the water body. The lifelike swimming motion which is produced by the repeated "walking" motion of the fishing lure 1 as it is retrieved through the water body attracts the attention of fish to the fishing lure 1, increasing the likelihood that the fish will strike the fishing lure 1 and set the fishing hook 20 (FIG. 8).

Referring next to FIG. 5 of the drawings, an alternative illustrative embodiment of the enhanced action fishing lure is generally indicated by reference numeral 1a. The fishing lure 1a includes at least one action bump 12 having a longitudinal action bump axis 18 which may be oriented at an acute angle with respect to the longitudinal lure body axis 10 of the lure body 2. In some embodiments, the action bump 12 may protrude from the left side lure body surface 3 of the lure body 2, as illustrated. In some embodiments, the action bump 12 may protrude from the right side lure body surface 4 of the lure body 2.

Referring next to FIG. 6 of the drawings, another alternative illustrative embodiment of the enhanced action fishing lure is generally indicated by reference numeral 1b. The fishing lure 1b includes at least one action bump 12 having a longitudinal action bump axis 18 which may be oriented at an obtuse angle with respect to the longitudinal lure body axis 10 of the lure body 2. In some embodiments, the action bump 12 may protrude from the left side lure body surface 3 of the lure body 2, as illustrated. In some embodiments, the action bump 12 may protrude from the right side lure body surface 4 of the lure body 2.

Referring next to FIGS. 7, 13 and 14 of the drawings, another illustrative embodiment of the enhanced action fishing lure is generally indicated by reference numeral 1c. As illustrated in FIG. 13, in some embodiments, the fishing lure 1c includes at least two action bumps 12 which protrude from the left side lure body surface 3 of the lure body 2. As illustrated in FIG. 14, in some embodiments, the action bumps 12 protrude from the right side lure body surface 4 of the lure body 2. As illustrated in FIG. 7, the action bumps 12 may be oriented in generally parallel, spaced-apart relationship with respect to each other. As illustrated in FIGS. 13 and 14, in some embodiments, the action bumps 12 may progressively decrease in cross-sectional area from the head body portion 2a toward the tail body portion 2c of the lure body 2. The longitudinal action bump axis 18 (FIG. 7) of each action bump 12 may intersect the longitudinal lure body axis 10 of the lure body 2. As further illustrated in FIG. 7, in some embodiments, the longitudinal action bump axis 18 of each action bump 12 may be disposed in generally perpendicular relationship with respect to the longitudinal lure body axis 10 of the lure body 2. In other embodiments, the longitudinal action bump axis 18 of each action bump 12 may be disposed at an acute angle with respect to the longitudinal lure body axis 10 of the lure body 2. In still other embodiments, the longitudinal action bump axis 18 of each action bump 12 may be disposed at an obtuse angle with respect to the longitudinal lure body axis 10 of the lure body 2.

In exemplary application, the lure body 2 of the fishing lure 1c is attached to a fishing hook 20 which is tied to a fishing line 28 typically as was heretofore described with respect to the fishing lure 1 in FIG. 8. The fishing lure 1c is retrieved through a water body (not illustrated) typically by rotating the fishing rod-mounted reel (not illustrated) on which the fishing line 28 is wound in the conventional manner, as was heretofore described. In embodiments of the fishing lure 1c in which the action bumps 12 protrude from the left side lure body surface 3 of the lure body 2, as illustrated in FIG. 13, the fishing lure 1c repeatedly "vibrates" to the left along curved swim paths 34 as the fishing lure 1c is retrieved through the water body. In embodiments of the fishing lure 1c in which the action bumps 12 protrude from the right side lure body surface 4 of the lure body 2, as illustrated in FIG. 14, the fishing lure 1c repeatedly "vibrates" to the right along curved swim paths 34 as the fishing lure 1c is retrieved through the water body. The lifelike swimming motion which is produced by the repeated vibrating action of the fishing lure 1c as it is retrieved through the water body attracts the attention of fish to the fishing lure 1c, increasing the likelihood that the fish will strike the fishing lure 1c and set the fishing hook 20 (FIG. 8).

While various illustrative embodiments have been described above, it will be recognized and understood that various modifications can be made and the appended claims are intended to cover all such modifications which may fall within the spirit and scope of the disclosure.

What is claimed is:

1. An enhanced action fishing lure, comprising:
   a soft lure body having a first side lure body surface, a second side lure body surface, an upper lure body edge, a lower lure body edge, a front lure body edge, a lure tail opposite the front lure body edge and a longitudinal lure body axis aligned with the front lure body edge and the lure tail, each of the first side lure body surface and the second side lure body surface being non-concave from the front lure body edge to the rear lure body edge;
   at least one elongated action bump protruding from only one of the first side lure body surface and the second side lure body surface between the front lure body edge and the lure tail, the at least one action bump rendering the lure body asymmetrical and extending generally from the upper lure body edge to the lower lure body edge of the lure body and having a longitudinal action bump axis perpendicular to the longitudinal lure body axis of the lure body;
   a front action bump surface and a rear action bump surface on the at least one action bump; and
   an elongated front indentation and an elongated rear indentation formed at junctions where the front action bump surface and the rear action bump surface, respectively, of the at least one action bump meet the one of the first side lure body surface and the second side lure body surface, the one of the first side lure body surface and the second side lure body surface and the at least one action bump being located entirely on opposing sides of the junctions in a direction which is transverse to the longitudinal lure body axis.

2. The fishing lure of claim 1 wherein the lure body comprises a head body portion and a middle body portion extending from the head body portion, and wherein the tail body portion extends from the middle body portion.

3. The fishing lure of claim 2 wherein the at least one action bump is generally between the head body portion and the middle body portion of the lure body.

4. The fishing lure of claim 2 wherein the at least one action bump comprises at least two generally elongated, parallel, spaced-apart action bumps.

5. The fishing lure of claim 1 wherein the front lure body edge extends from the upper lure body edge.

6. The fishing lure of claim 1 wherein the at least one action bump comprises a first action bump end generally flush with the upper lure body edge and a second action bump end generally flush with the lower lure body edge.

7. An enhanced action fishing lure, comprising:
   a generally elongated soft lure body having a longitudinal lure body axis and including a head body portion, a middle body portion extending from the head body portion, a tail body portion extending from the middle body portion, a generally protrusion-free and non-concave first side lure body surface, a non-concave second side lure body surface opposite the first side lure body surface, an upper lure body edge and a lower lure body edge;
   a single generally elongated action bump protruding from only the second side lure body surface generally at the head body portion, the action bump extending generally from the upper lure body edge to the lower lure body edge of the lure body and rendering the lure body asymmetrical and having a longitudinal action bump axis perpendicular to the longitudinal lure body axis of the lure body;
   a front action bump surface and a rear action bump surface on the action bump; and an elongated front indentation and an elongated rear indentation formed at junctions where the front action bump surface and the rear action bump surface, respectively, of the action bump meet the second side lure body surface, the second side lure body surface and the at least one action bump being located entirely on opposing sides of the junctions in a direction which is transverse to the longitudinal lure body axis.

8. The fishing lure of claim 7 further comprising an outer action bump surface extending between the front action bump surface and the rear action bump surface.

9. The fishing lure of claim 8 wherein each of the front action bump surface, the rear action bump surface and the outer action bump surface is convex.

10. The fishing lure of claim 7 wherein the lure body comprises a front lure body edge extending from the upper lure body edge and the lower lure body edge.

11. An enhanced action fishing lure, comprising:

a generally elongated lure body having a longitudinal lure body axis and including a head body portion, a middle body portion extending from the head body portion, a tail body portion extending from the middle body portion, a generally planar and non-concave first side lure body surface, a generally planar and non-concave second side lure body surface opposite the first side lure body surface and an upper lure body edge, a front lure body edge and a lower lure body edge bounding the first side lure body surface and the second side lure body surface;

at least two generally elongated action bumps protruding from only one of the first side lure body surface and the second side lure body surface between the head body portion and the middle body portion and the at least two action bumps rendering the lure body asymmetrical and extending generally from the upper lure body edge to the lower lure body edge of the lure body in generally parallel, spaced-apart relationship to each other and each having a longitudinal bump axis intersecting and perpendicular to the longitudinal lure body axis of the lure body;

a front action bump surface and a rear action bump surface on each of the at least two action bumps; and an elongated front indentation and an elongated rear indentation formed at junctions where the front action bump surface and the rear action bump surface, respectively of each of the at least two action bumps meet the one of the first side lure body surface and the second side lure body surface, the one of the first side lure body surface and the second side lure body surface and the at least one action bump being located entirely on opposing sides of the junctions of each of the at least two action bumps in a direction which is transverse to the longitudinal lure body axis.

* * * * *